(12) United States Patent
Chen et al.

(10) Patent No.: US 11,921,819 B2
(45) Date of Patent: Mar. 5, 2024

(54) DEFENSE METHOD AND AN APPLICATION AGAINST ADVERSARIAL EXAMPLES BASED ON FEATURE REMAPPING

(71) Applicant: ZHEJIANG UNIVERSITY OF TECHNOLOGY, Hangzhou (CN)

(72) Inventors: Jinyin Chen, Hangzhou (CN); Haibin Zheng, Hangzhou (CN); Longyuan Zhang, Hangzhou (CN); Xueke Wang, Hangzhou (CN)

(73) Assignee: ZHEJIANG UNIVERSITY OF TECHNOLOGY, Hangzhou (CN)

( * ) Notice: Subject to any disclaimer, the term of this patent is extended or adjusted under 35 U.S.C. 154(b) by 203 days.

(21) Appl. No.: 17/602,437

(22) PCT Filed: Jul. 21, 2020

(86) PCT No.: PCT/CN2020/103264
§ 371 (c)(1),
(2) Date: Oct. 8, 2021

(87) PCT Pub. No.: WO2021/169157
PCT Pub. Date: Sep. 2, 2021

(65) Prior Publication Data
US 2022/0172000 A1 Jun. 2, 2022

(30) Foreign Application Priority Data
Feb. 25, 2020 (CN) .......................... 202010115357.X (51) Int. Cl.
*G06F 18/214* (2023.01)
*G06F 18/213* (2023.01)
*G06F 18/2413* (2023.01)

(52) U.S. Cl.
CPC ........ *G06F 18/2148* (2023.01); *G06F 18/213* (2023.01); *G06F 18/2413* (2023.01)

(58) Field of Classification Search
None
See application file for complete search history.

(56) References Cited

U.S. PATENT DOCUMENTS 9,705,904 B1 * 7/2017 Davis .................... G06F 21/562
2016/0202171 A1 * 7/2016 Kavsek .................. G01N 21/49
356/39

(Continued)

FOREIGN PATENT DOCUMENTS

| CN | 106296692 A | 1/2017 |
|---|---|---|
| CN | 108322349 A | 7/2018 |

(Continued)

*Primary Examiner* — Santiago Garcia
(74) *Attorney, Agent, or Firm* — Jiwen Chen; Joywin IP Law PLLC (57) ABSTRACT

A defense method against adversarial examples based on feature remapping, includes the following steps: building the feature remapping model, the feature remapping model is composed of the significant feature generation model and the nonsignificant feature generation model, and a shared discriminant model, the significant generation model is used to generate significant features, the nonsignificant generation model is used to generate nonsignificant features, and the shared discriminant model is used to discriminate fake or true of generated significant and nonsignificant features. The method combines the significant feature generation model and the nonsignificant feature generation model to build the detector that is used to detect adversarial examples and benign examples; builds the re-recognizer according to the significant feature generation model, the re-recognizer is used to recognize the type of adversarial examples while detecting; connects the detector to the output of the target model, and then use the detector to detect adversarial examples. While recognizing adversarial examples, the method connects the re-recognizer to the output of the target model, and then uses the re-recognizer to recognize adver- (Continued)

sarial examples. The present invention can achieve dual defense effects of the detection and re-recognition of adversarial examples.

7 Claims, 1 Drawing Sheet

(56) References Cited

U.S. PATENT DOCUMENTS

| | | | |
|---|---|---|---|
| 2018/0268266 A1* | 9/2018 | Sohn | G06F 18/217 |
| 2019/0026274 A1* | 1/2019 | Deng | G06F 18/241 |
| 2020/0311474 A1* | 10/2020 | Toyoda | G06F 3/04817 |
| 2020/0311913 A1* | 10/2020 | Soni | G16H 30/40 |
| 2020/0342234 A1* | 10/2020 | Gan | G06V 20/46 |
| 2020/0356718 A1* | 11/2020 | Chu | G06N 3/08 |
| 2020/0364245 A1* | 11/2020 | Sinha | G06F 3/0482 |
| 2020/0380300 A1* | 12/2020 | Zhang | G06F 18/2431 |
| 2020/0410074 A1* | 12/2020 | Dang | G06F 18/22 |
| 2021/0037044 A1* | 2/2021 | Achanta | H04L 63/1441 |
| 2021/0397170 A1* | 12/2021 | Zhou | H01L 22/12 |

FOREIGN PATENT DOCUMENTS

| | | |
|---|---|---|
| CN | 108446765 A | 8/2018 |
| CN | 109460814 A | 3/2019 |
| CN | 109543740 A | 3/2019 |
| CN | 110674938 A | 1/2020 |
| WO | WO2019143384 | 7/2019 |
| WO | WO2019207770 | 10/2019 |

* cited by examiner

DEFENSE METHOD AND AN APPLICATION AGAINST ADVERSARIAL EXAMPLES BASED ON FEATURE REMAPPING

This is a U.S. national stage application of PCT Application No. PCT/CN2020/103264 under 35 U.S.C. 371, filed Jul. 21, 2020 in Chinese, claiming priority to Chinese Patent Applications No. 202010115357.X, filed Feb. 25, 2020, all of which are hereby incorporated by reference.

TECHNICAL FIELD

The present disclosure generally relates to the field of defense in deep learning adversarial attack and defense, and more specifically, to a defense method and an application against adversarial examples based on feature remapping.

BACKGROUND TECHNOLOGY

With the increase of hardware computation performance, the support of the storage of the big data and the complete of the theoretical framework, deep learning technology has been applied into various fields with its powerful feature extraction ability and fitting ability, which covers computer vision field, natural language processing field and bioinformatics field. Meanwhile, deep learning technology gradually moves towards industrialization from laboratories, in which the application of autonomous driving is the most prominent. The street sign recognition, license plate recognition, pedestrian recognition, road recognition, and obstacle detection, etc. are all involved in computer vision technology, and voice command control involved speech recognition technology. With the further widespread apply of deep learning technology, the existing problems are emerged gradually.

As early as 2014, researchers found that deep models were vulnerable to attacks from adversarial examples, i.e., adversarial attack. Specifically, the well-trained deep models achieve a good recognition accuracy for the benign samples in test set, however, after adding a small, well-crafted adversarial perturbation to the original benign samples that could be recognized correctly, the resulting adversarial examples will be incorrectly recognized by deep models. Adversarial attack revealed bugs in deep models, while such bugs will hinder the further development of deep learning. Taking the autonomous driving system as an example, the adversarial attack will cause fatal impact on the driving security, if a small sticker is attached to the original "STOP" street sign, the street sign recognition model in the autonomous driving system will recognize the original "STOP" street sign as the sign for the speed limit of "40" instead of the "STOP" sign, which is very dangerous to drivers and pedestrians.

The adversarial attack can be classified as white-box attack or black-box attack according to whether the attacker knows the internal details of the deep model. Besides, the adversarial attack can be classified as targeted attack or non-targeted attack according to whether the attacker sets attack targets, the adversarial attack can also be classified as electronic countermeasure attack or physical adversarial attack according to the scenarios that the attack happens. The final goal of studying adversarial attack is to find out the bugs in deep models and to enhance the security and robustness of the models. Thus, researchers have also purposed many defense technologies aiming at adversarial attacks. The adversarial attack can be classified as the complete defense or the detect-only defense according to different goals to be achieve by defenses. The adversarial attack can be divided mainly into three types according to the positions that defenses implement, they are data modify defense, model modify defense, and additional structure defense, respectively. The latest research shows that the exist of adversarial examples is not a bug but a feature in deep learning models, and this feature can be recognized by machines easily, but it is hard to be understood by human beings.

Complete defense is a defense method that is used to re-recognize the labels of the original benign sample corresponding to the adversarial example; and detect-only defense is used to recognize whether the example to be detected is an adversarial example or a benign sample.

Data modify defense method achieves defense by modifying the input data to damage the well-crafted adversarial perturbations implemented on original samples. The commonly used dataset modification defense methods include data resizing, data rotate, data flip, and data recode, the problems of these methods are that not only will they do damage to perturbations implemented on adversarial examples but also will change the distribution of original data samples simultaneously. Since these methods belong to indiscriminate defense, it is impossible to achieve detecting adversarial examples first, and then defense against the adversarial examples in a targeted manner.

Model modify defense method consists of modifying the number of layers, modifying the activation function, and modifying the connection density of models, the main problem is that structure details of the original model are unknown so that the security of model privacy cannot be achieved.

Additional structural defense method achieves defense by adding additional substructures to outer or inner of original models. Most of the outer additional substructures are detectors that can only achieve the detection of adversarial examples while the majority of them have the problems of complicated structures, however, the inner additional structures require the private information of models.

SUMMARY OF THE INVENTION

To overcome the weakness in existing defense methods like street sign recognition, license plate recognition, pedestrian recognition, road recognition, and obstacle detection requiring obtaining the privacy information of the original models, causing impact on the recognition of the original benign samples, and the structure of defense model is too complex, to achieve dual defense effects of the detection and re-recognition of adversarial examples, the present disclosure provides a defense method and an application against adversarial examples based on feature remapping.

The technical solution of present invention is:

A defense method against adversarial examples based on feature remapping includes the following steps:

Building the feature remapping model, wherein the feature remapping model is composed of the significant feature generation model and a nonsignificant feature generation model, and a shared discriminant model. The significant feature generation model is used to generate significant features, the nonsignificant feature generation model is used to generate nonsignificant features, and the shared discriminant model is used to discriminate fake or real of generated significant and nonsignificant features; and Combining the significant feature generation model and the nonsignificant feature generation model together to build the detector that is used to detect adversarial examples and benign samples; and Building the re-recognizer according to the significant feature generation model, the re-recognizer is used to recognize the type of adversarial examples.

While detecting adversarial examples, connecting the detector to the output of the target model, then use the detector to detect adversarial examples;

While recognizing adversarial examples, connecting the re-recognizer to the output of the target model, then use the re-recognizer to recognize adversarial examples.

Preferably, the approach of building the feature remapping model is:

Building a training system of the feature remapping model, wherein the training system is composed of the target model, the significant feature generation model, the nonsignificant feature generation model, and the shared discriminant model, the target model is used to recognize targets, the input of the model are samples, and the model outputs features of hidden layers; the input of the significant feature generation model are features of hidden layers, and the model outputs significant features; the input of the nonsignificant feature generation model are features of hidden layers, and the model outputs nonsignificant features; the input of shared discriminant model is generated significant features, generated nonsignificant features, real significant features, and real nonsignificant features, the model outputs recognition results of benign samples or adversarial examples; and Building loss function $loss_D$ to train the shared discriminant model, training the significant generation model, and training the nonsignificant generation model loss function $loss_G$; using loss functions $loss_D$ and $loss_G$ to train the shared discriminant model, the significant generation model, and the nonsignificant generation model to determine model parameters;

Wherein loss function is $loss_D = loss_D^{adv,SF} + loss_D^{adv,NSF} + loss_D^{ben,SF} + loss_D^{ben,NSF}$, $loss_D^{adv,SF}$ is the loss function of the shared discriminant model while training of significant features generate of adversarial examples, $loss_D^{adv,NSF}$ is the loss function of the shared discriminant model while training of nonsignificant features generate of adversarial examples, $loss_D^{ben,SF}$ is the loss function of the shared discriminant model while training of significant features generate of benign samples, $loss_D^{ben,NSF}$ is the loss function of the shared discriminant model while training of nonsignificant features generate of benign samples; and The loss function $loss_G = loss_G^{adv,SF} + loss_G^{adv,NSF} + loss_G^{ben,SF} + loss_G^{ben,NSF}$, $loss_G^{adv,SF}$ is the loss function of the significant feature generation model while training of significant features generation of adversarial examples, $loss_G^{adv,NSF}$ is the loss function of the nonsignificant feature generation model while training of nonsignificant features generation of adversarial examples, $loss_G^{ben,SF}$ is the loss function of the significant features generation model while training of significant features generation of benign samples, $loss_G^{ben,NSF}$ is the loss function of the nonsignificant feature generation model while training of nonsignificant features generation of benign samples.

Preferably, the approach of building the detector is:

Building a training system of the detector, the training system is composed of the target model, the parameter-determined significant feature generation model, the parameter-determined nonsignificant feature generation model, and the detect model, wherein the target model is used to target recognize, the input of the model are samples, and the model outputs features of hidden layers; the input of the nonsignificant feature generation model are features of hidden layers, and the model outputs nonsignificant features; the input of the detection model is cascaded feature of generated significant features and generated nonsignificant features, the model outputs detection results of benign samples or adversarial examples; and Building the loss function $loss_{detect}$ for training the detection model to minimize the loss function $loss_{detect}$ and to determine model parameters; and The loss function $loss_{detect}$ is:

$$loss_{detect} = -[\log(Det(concat(G_{SF}(h(x_i)), G_{NSF}(h(x_i))))) + \log(1 - Det(concat(G_{SF}(h(x_i^{adv,j})), G_{NSF}(h(x_i^{adv,j})))))]$$

Where in loss function $loss_{detect}$, $\log(\cdot)$ implies the logarithmic function, $Det(\cdot)$ is the detection model, $h(\cdot)$ represents the output of hidden layers of the target model, $x_i$ represents benign samples, $x_i^{adv,j}$ indicates the adversarial examples corresponds with $x_i$, $G_{SF}(\cdot)$ represents the significant feature generation model, $G_{NSF}(\cdot)$ represents the nonsignificant feature generation model, and $concat(G_{SF}(\cdot), G_{NSF}(\cdot))$ represents the cascaded feature.

Preferably, the approach of building the re-recognizer is:

Building a training system of the detector, the training system is composed of the target model, the parameter-determined significant feature generation model, and the re-recognize model, wherein the target model is used to recognize targets, the input of the model are samples, and the model outputs features of hidden layers; the input of the significant feature generation model are features of hidden layers, and the model outputs significant features; the input of the re-recognize model are generated significant features, and the model outputs types of adversarial examples; and Building the loss function $loss_{re-recog}$ for training the re-recognition model to minimize the loss function $loss_{re-recog}$ and to determine model parameters; and The loss function $loss_{re-recog}$ is:

$$loss_{re-recog} = -\sum_{i=1}^{N_{sam}^{adv}} \sum_{k=0}^{m-1} y_i^{one-hot(k)} \log\left(y_i^{conf(k)}\right)$$

Where in loss function $loss_{re-recog}$, $\log(\cdot)$ implies the logarithmic function, $y_i^{one-hot(k)}$ represents the value at the k-th position for the adversarial example corresponding to the original benign sample after being encoded by one-hot, k is the original sample classification index, $y_i^{conf(k)}$ represents $h(x_i^{adv,j})$ obtained after the adversarial example input into the target model, then input $h(x_i^{adv,j})$ to a parameter-determined significant feature generation model to obtain $G_{SF}(h(x_i^{adv,j}))$ and input the generated significant feature into the re-recognize model to get the value at the k-th position of the confidence matrix; k is the original sample classification index, m represents the classification number of the original sample; i is the adversarial example classification index, and $N_{sam}^{adv}$ represents the amount of adversarial examples in the training set.

Preferably, the approach of training feature remapping model, detector, and re-recognizer is:

(a) For the original benign samples $x_i$, testing whether the predicted labels in the target model are consistent with the real labels first. If not, then eliminating the benign samples and do not attack these samples. If so, then go to step (b); and (b) For the target model and the benign samples $x_i$, using $m_a$ different attack methods to attack, then obtaining the corresponding adversarial example set $\{x_i^{adv,1}, x_i^{adv,2}, \ldots, x_i^{adv,m_a}\}$; and (c) After the attack complete, inputting the adversarial examples obtained in adversarial example set in step (b) to the target model one by one for testing. If the predicted labels are not consistent with real labels, that indicates the attack is successful and the adversarial example should be kept in the set; if consistent, that indicates the attack failed, the sample should be eliminated from the set; and (d) Repeating step (a)~(c) to collect the set of adversarial examples for all samples; and (e) Resorting the samples in the adversarial example set $X^{adv}=\{x_i^{adv,j}\}$.

Preferably, the significant feature generation model and the nonsignificant feature generation model have the same structure, which is an input layer, a hidden unit, and an output layer, successively, wherein the hidden unit contains several hidden layers, and each hidden layer is at least a fully connected layer or a convolutional layer.

Preferably, the shared discriminant model, the detection model, and the re-recognize model have the same structure, which is an input layer, a hidden unit, a transition layer, and an output layer, successively, wherein the hidden unit contains several hidden layers, and each hidden layer is at least a fully connected layer or a convolutional layer.

The technical idea of the present is: a defense method against adversarial examples based on feature remapping. By designing the feature remapping model, mapping the features extracted from the hidden layer module in the deep learning model into significant features and nonsignificant features respectively, and further learning the discrepancies between adversarial examples and benign samples to achieve the detection of adversarial examples and re-recognizing the original labels of the adversarial examples. Finally, by training models on the CIFAR10 dataset, and using different attack methods to attack, then using the defense method provided in the present for detection. During the re-recognize stage, comparing the presented defense method to the sample resize defense method and the sample rotate defense method, the result shows that the defense method against adversarial examples based on feature remapping has a good effect.

A defense method against adversarial attacks in autonomous driving, taking the dataset containing 4 types of outdoor vehicles and 6 types of natural wildlife images as the training set, and taking the defense method against adversarial examples based on feature remapping as stated above to build the detector and the re-recognizer. While detecting adversarial examples, connecting the detector to the output of the target model and utilizing the detector to detect adversarial examples; while recognizing adversarial examples, connecting the re-recognizer to the output of the target model and utilize the re-recognizer to recognize adversarial examples.

The beneficial effects of the present are: 1) by detecting the adversarial example first, and then re-recognizing the adversarial examples, to minimize the impact of the additional defense method on the recognition accuracy of the benign samples; and 2) the defense measurement of adopting additional model has no use for acquiring the internal details of the model, which protects the privacy of users and models; and 3) The proposed additional model structure is relatively simple; and 4) it can achieve the function of adversarial example detection and re-recognize to meet different application requirements.

BRIEF DESCRIPTION OF THE DRAWINGS

In order to explain the embodiments of the present invention or the technical solutions in the prior art more clearly, the following will briefly introduce the drawings that need to be used in the description of the embodiments or the prior art. Obviously, the drawings in the following description are only some embodiments of the present invention. For those of ordinary skill in the art, other drawings can be obtained based on these drawings without creative work.

SPECIFIC EMBODIMENTS OF THE INVENTION

To make it more clear of the goal, the technical solution, and the strongpoints of the present, in the following description, for the purpose of explanation, specific details are set forth with the accompanying drawings and the embodiment to provide an understanding and apparent of the present disclosure. It should be understood that the specific embodiments described herein are merely illustrative of the invention and do not limit the scope of the invention.

Figure 1:
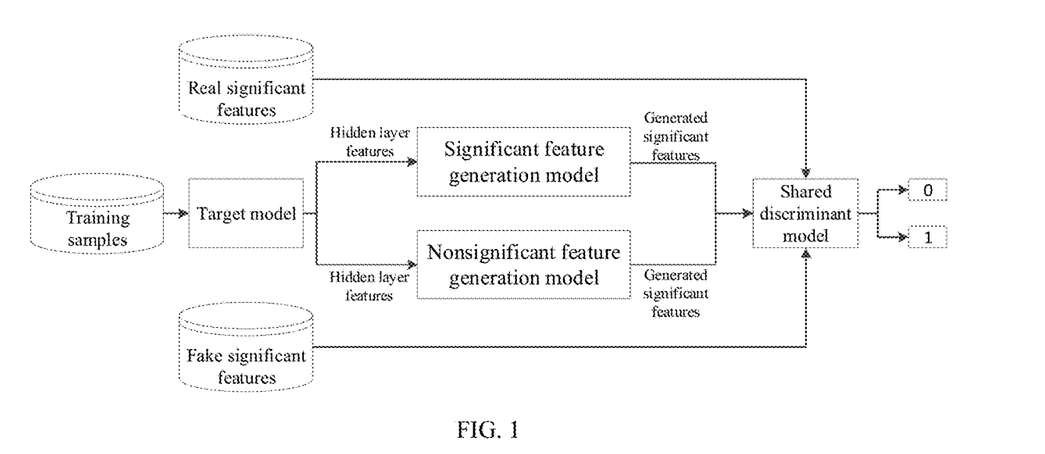
FIG. 1 is a schematic structural diagram of a feature remapping model training system according to some embodiments.
Figure 2:
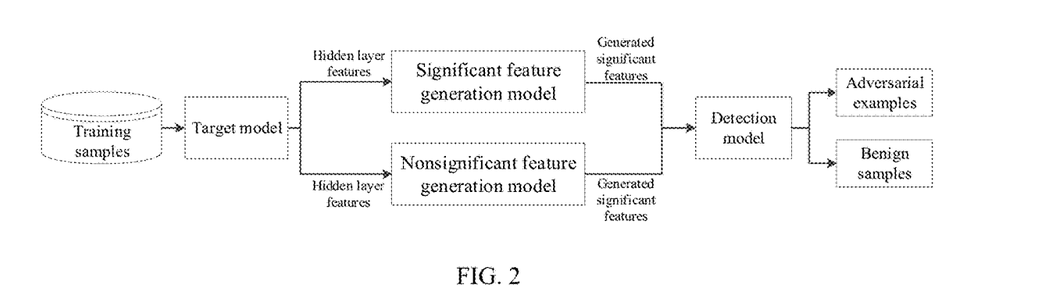
FIG. 2 is a schematic structural diagram of a detector training system according to some embodiments.
Figure 3:
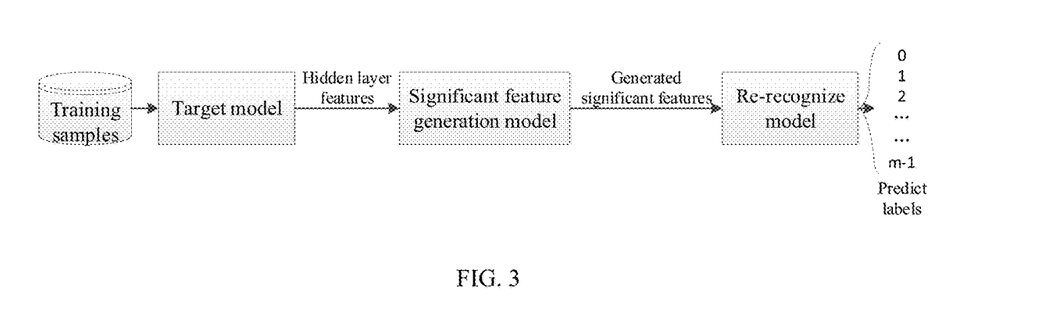
FIG. 3 is a schematic structural diagram of a re-recognizer training system according to some embodiments.

By referring FIG. 1 to FIG. 3, the defense method against adversarial examples based on feature remapping provided by the embodiment includes the following steps:

S101, building the feature remapping model, wherein the feature remapping model is composed of the significant feature generation model and the nonsignificant feature generation model, and the shared discriminant model, the significant generation model is used to generate significant features, the nonsignificant generation model is used to generate nonsignificant features, and the shared discriminant model is used to discriminate fake or real of generated significant and nonsignificant features.

The training samples is needed while training all models, the training samples consist of benign samples and adversarial examples, the data sample format is defined as a set X ($X=\{x_1, x_2, x_3, \ldots, x_{N_{sam}}\}$) containing $N_{sam}$ samples, each sample is represented as $x_i \in R^{H \times W \times c}$ ($i=1, 2, \ldots, N_{sam}$), namely, $x_i$ is a matrix that contains H×W×c samples, H means height, W means width, and c indicates the number of channels. The labels of the dataset can be represented as set $Y=\{y_1, y_2, \ldots, y_{N_{sam}}\}$, each sample corresponds with a label $y_i$ that indicates the i-th sample $x_i$ belongs to $y_i$-th class, where $y_i=\{0, 1, 2 \ldots, m-1\}$ ($i=1, 2, \ldots, N_{sam}$), that means the dataset is an m-classification dataset. And define the one-hot encoding format for the sample labels, which is represented as $y_i^{one-hot}=\{00 \ldots 1 \ldots 00\}$, namely, a vector containing m elements, and the $y_i$-th value of the element is 1, and the value of the rest elements is 0.

Denoting F(X, Θ): X→Y as DNN, a deep model, where Θ represents the model parameters obtained while training the model on the dataset {X, Y}. The function that deep model achieves is to map data X to Y, the DNN is the attacker's attack target while attacking and it is the defender's defend target while defending, that is target model, when applying in real physical world, the target model can be applied in street sign recognition, license plate recognition, pedestrian recognition, road recognition, obstacle detection, and speech recognition in autonomous driving systems, namely, the present provides the defense method against adversarial examples based on feature remapping can be used in the defense of street sign recognition, license plate recognition, pedestrian recognition, road recognition, obstacle detection, and speech recognition, DNN is composed of 3 parts, they are input layer modules, hidden layer modules, and output layer modules. The input layer module obtains data samples; the hidden layer module extracts the sample features and amplifies the useful features to achieve feature mapping; the final layer output of the hidden layer module is called the logits layer; the output layer module adopts the Softmax function to normalize logits to obtain a confidence vector and takes the position of the neuron with the largest confidence value in the vector as the label for DNN prediction. Define the logits output by the target model as the feature of the input sample in the last layer of the hidden layer module, denote the logits as $h(x_i)$; the confidence after Softmax normalization is represented as the 1×m confidence vector $y_i^{conf}$; the final prediction label is represented as $\hat{y}_i = \arg\max(y_i^{conf})$, where the function arg max(·) returns the position with the largest element value in the vector $y_i^{conf}$ the labels of prediction set are represented as $\hat{Y}=\{\hat{y}_1, \hat{y}_2, \hat{y}_3, \ldots, \hat{y}_{sam}\}$. While the predicted label of the sample $x_i$ is consistent with the real label $\hat{y}_i$, that is, the target model predicts the input sample correctly.

Based on determined benign samples and deep models, adversarial examples can be generated by using attack methods. This present use different attack methods to get adversarial examples, including the white-box attack methods and the black-box attack methods. When imposing a white-box attack, it is necessary to obtain the gradient information of the target model. The white-box attack methods used include but are not limited to the fast gradient sign method (FGSM) and the momentum iterative fast gradient sign method (MI-FGSM), basic iterative methods (BIM), iterative least-likely class (ILCM), Jacobian saliency map (JSMA), Confusion deep attack method (DeepFool), Carlini & Wagner attacking method (C&W), etc. When performing a black box attack, only the output information of the target model needs to be obtained. The black box attack methods used include, but are not limited to, single pixel attack (single pixel attack), zero order optimization (ZOO), boundary Attack method (Boundary) etc. The specific attack process is:

(a) For the original benign samples, testing whether the predicted labels in the target model are consistent with the real labels first. If not, then eliminate the benign samples and do not attack these samples. If so, then go to step (b); and (b) For the target model and the benign samples $x_i$, using $m_a$ different attack methods to attack, then obtaining the corresponding adversarial example set $\{x_i^{adv,1}, x_i^{adv,2}, \ldots, x_i^{adv,m_a}\}$; and (c) After the attack complete, inputting the adversarial examples obtains in adversarial example set in step (b) to the target model one by one for testing; if the predicted labels are not consistent with real labels, that indicating the attack successful and the adversarial example should be kept in the set; if consistent, that indicates the attack fails, the sample should be eliminated from the set; and (d) Repeating steps (a)~(c) to collect the set of adversarial examples for all samples; and (e) Resorting the samples in the adversarial example set $X^{adv}=\{x_i^{adv,j}\}$.

The function of feature mapping model is remapping the input features into significant features and nonsignificant features, respectively. For adversarial examples, the significant features are the features learned by the model that are useful to human beings, and the nonsignificant features are the features learned by the model that are not useful to human beings; for benign samples, the significant features and nonsignificant features are both learned by the model and are both useful to human beings.

The feature mapping model consists of 3 parts, the significant feature generation model, the nonsignificant feature generation model, and the shared discriminant model. Each model is composed of 3 components: the input layer module, the hidden layer module, and the output layer module. The input of the significant feature generation model is the output feature $h(x_i)$ of the hidden layer module of the target model, the output of the feature generate model is generated significant feature; the nonsignificant input of the feature generate model is the output feature $h(x_i)$ of the hidden layer module of the target model, the output of the feature generate model is generated nonsignificant feature; the input of the shared discriminant model are the generated significant feature, the generated nonsignificant features, the real significant features, and the real nonsignificant features, the output of the shared discriminant model is the discriminant result 0 or 1.

The size of the input layer module and the output layer module of the significant feature generation model and the nonsignificant feature generation model are the same as feature $h(x_i)$; the size of the input layer module of the shared discriminant model is consistent with the size of the feature $h(x_i)$, the output layer module is a single neuron activated by the Sigmoid function.

For the hidden layer module of the significant feature generation model, the present provides three different construction strategies. The first is the fully connected strategy, namely, the hidden layer modules all use the fully connected layers, and the number of layers is 2a+1, where a=1, 2, 3 . . . , which can be adjusted according to the computation performance of the hardware. Assuming that the size of the input layer module and the output model is $s_{in}$, that means it contains $s_{in}$ elements, then the number of neurons in the i-th layer is:

$$l_i^{fc} = \begin{cases} s_{in} + Z[(s_{middle} - s_{in})/(a+1)] \times i, & 1 \leq i \leq a \\ s_{middle}, & i = a+1 \\ s_{in} + Z[(s_{middle} - s_{in})/(a+1)] \times (2a+2-i), & a+1 < i \leq 2a+1 \end{cases} \quad (1)$$

Where in equation (1), $l_i^{fc}$ represents the number of neurons in the i-th layer, the number of fully connected layers of the hidden layer module is an odd number, $s_{middle}$ represents the number of neurons in the middle layer, Z[·] is the rounding function, $s_{in}$ represents the size of the input layer module and output model, i.e., the number of neurons in the input layer and output layer. Take input layer $s_{in}$=100, middle layer $s_{middle}$=400, a=2, 5 hidden layers in total as an example, the numbers of neurons from the first layer to the fifth layer are 200, 300, 400, 300, 200, respectively. The value of a and $s_{middle}$ determines the number of layers and neurons in each layer, and the value can be adjusted according to the computation power. In the full connect strategy, the dropout ratio of each fully connected layer ranges from 0.3 to 0.8, i.e. [0.3,0.8], the activation function choices include but are not limited to ReLU, Leaky ReLU, tan h, exponential linear activation, Sigmoid activation, etc.

The second strategy is the full convolution strategy, i.e., all hidden layer modules use convolutional structure, the number of layers is 2b+1, b=1,2,3 . . . , the value can be adjusted according to hardware computation performance. The convolutional layer is mainly determined by the convolution kernel size. The convolution kernel size includes window size, kernel depth, and strides. The following specifically describes the settings of the three parameters of window size, kernel depth, and strides.

The window of the convolution kernel is square, i.e., the length and width are the same, the window size includes but not limited to these types such as {1×1, 3×3, 5×5, 7×7}, different convolutional layers can have different window sizes, the stride includes but not limited to these types such as {0, 1, 2, 3, 4, 5}. However, the scale relationship between the stride and the window size is that the window size is larger than the stride, taking the 3×3 window size as an example, the stride can be one of {0,1, 2}. Next, to determine the parameter of kernel depth, assuming that the size of the input layer module and the output model is $s_{in}$, i.e., contains $s_{in}$ elements, to be suitable for the convolutional structure, the present designs a transition layer to connect the input layer module and the output layer module with the hidden layer module, respectively. The transition layer between the input layer module and the hidden layer module is designed as follows, fully connecting $s_{in}$ neurons of the input layer to $s_{trans}$ neurons, then reshaping the $s_{trans}$ neurons to a $w_{re} \times w_{re} \times 1$ rectangular neuron matrix, i.e., $s_{trans} = w_{re} \times w_{re} \times 1$. The transition layer between the hidden layer module and the output layer module is designed to fully connected the output of the hidden layer module to a fully connected layer containing $s_{trans}$ neurons, and then connecting the fully connected layer of $s_{trans}$ neurons to the output layer module again.

The depth of the i-th convolution kernel of the hidden layer module in the full convolution strategy is determined by the most recent principle. The most recent principle implies that calculating the theoretical depth of the first layer of convolution kernel first, and then selecting the value closest to the theoretical depth in the convolution kernel depth set {8,16,32,64,128, 256,1024} as the actual depth. The calculation equation of theoretical depth is:

$$l_i^{conv} = \begin{cases} l_{middle}^{conv} / (b+1) \times i, & 1 \le i \le b \\ l_{middle}^{conv}, & i = b+1 \\ l_{middle}^{conv} / (b+1) \times (2b+2-i), & b+1 < i \le 2b+1 \end{cases} \quad (2)$$

Where in equation (2), $l_i^{conv}$ indicates the number of neurons in the i-th layer, here the number of convolutional layers of the hidden layer module is an odd number of layers, $l_{middle}^{conv}$ indicates the number of neurons in the middle layer. The b and $l_{middle}^{conv}$ in the equation determines the number of layers and the depth for each convolution kernel in each layer, the values of them will be adjusted according to the hardware computation performance. In the full convolution strategy, the dropout ratio of each convolutional layer ranges from 0.3 to 0.8, i.e. [0.3, 0.8], the activation function choices include but are not limited to ReLU, Leaky ReLU, tan h, exponential linear activation, Sigmoid activation, etc., pooling window sizes include but are not limited to these types such as {1×1, 2×2, 3×3, 4×4, 5×5, 6×6}.

The third strategy is a hybrid strategy, namely, a fully connected layer and a convolutional layer are mixed in the hidden layer module. The number of fully connected layers and convolutional layers, the number of neurons in each fully connected layer, and the convolution kernel size of the convolutional layer are all determined according to the formulas in strategy one and strategy two.

For the hidden layer structure of the nonsignificant feature generation model, the structure of the hidden layer module of the nonsignificant feature generation model is consistent with the structure of the hidden layer module of the significant feature generation model. When any strategy of the hidden layer module of the significant feature generation model is determined, duplicating the strategy as the hidden layer module of the nonsignificant feature generation model.

The determination of the structure of the hidden layer module of the shared discriminant model follows three strategies of the hidden layer module of the significant feature generation model. The only difference is that there is a transition layer between the hidden layer module and the output layer model. The transition layer between the hidden layer module and the output layer module of the shared discriminant model is designed to fully connect the output of the hidden layer module to a fully connected layer with 128 neurons, and then connect the 128 neurons of the fully connected layer to the output layer module.

Based on the determined structure of the feature remapping model, defining the generated significant features, the generated nonsignificant features, the real significant features, and the real nonsignificant features of the adversarial examples, defining the generated significant features, the generated of nonsignificant features, the real significant features, and real nonsignificant features. The specific process is:

The significant features of the adversarial example are defined as the feature output by the hidden layer module of the model after the original benign sample corresponding to the adversarial example is input to the target model. That means that for the adversarial example $x_i^{adv,j}$, the corresponding original benign sample is $x_i$ and $h(x_i)$ is selected as the significant feature of the adversarial example.

The significant features of benign sample are defined as the feature output by the hidden layer module of the model after the benign sample is input to the target model, i.e., for benign samples $x_i$, $h(x_i)$ is selected as the significant features of benign samples.

The nonsignificant features of the adversarial example are defined as the features output by the hidden layer module of the model after the adversarial example is input to the target model, i.e., for adversarial examples $x_i^{adv,j}$, $h(x_i^{adv,j})$ is selected as the nonsignificant features of adversarial examples.

The non-significant features of benign samples are defined as the features output by the hidden layer module of the model after the benign samples are input to the target model, i.e., for benign samples $x_i$, $h(x_i)$ is selected as the nonsignificant feature of benign samples.

In summary, in the feature mapping model, when input feature is $h(x_i)$, the generated output of the significant feature generation model denotes as $G_{SF}(h(x_i))$, the corresponding real significant feature is $h(x_i)$; the generated output of the nonsignificant feature generation model denotes as $G_{NSF}(h(x_i))$ the corresponding real nonsignificant feature is $h(x_i)$. When input feature is $h(x_i^{adv,j})$, the generated output of the nonsignificant feature generation model denotes as $G_{NSF}(h(x_i^{adv,j}))$ the corresponding real nonsignificant feature is $h(x_i^{adv,j})$.

The specific process of training the feature remapping model is as follows:
  (a) training the generation of significant features of adversarial examples according to the built feature mapping model.

While training the significant feature generation of adversarial examples, the training model is composed of the significant feature generation model and the shared discriminant model. The significant feature generation model is denoted as $G_{SF}(\cdot)$ and the shared discriminant model is detonated as $D_{share}(\cdot)$.

The training process of these two models alternate, while training the shared discriminant model, the parameters of the significant feature generation model are fixed. The input of the target model is $x_i^{adv,j}$, the output of the hidden layer module of the target model is $h(x_i^{adv,j})$, and the output is used as the input of the significant feature generation model. The input of the shared discriminant model is $h(x_i)$ and $G_{SF}(h(x_i^{adv,j}))$, the training purpose is to discriminate whether the input features are real significant features or generated significant features, the output result is 1 or 0. During the stage of training the shared discriminant model, the real significant feature $h(x_i)$ is marked as 1, the generated significant feature $G_{SF}(h(x_i^{adv,j}))$ is marked as 0, take the cross entropy function as the loss function as shown in equation (3):

$$\text{loss}_D^{adv,SF} = -[\log(D_{share}(h(x_i))) + \log(1 - D_{share}(G_{SF}(h(x_i^{adv,j}))))] \quad (3)$$

Where in equation (3), $\log(\cdot)$ represents the logarithmic function, $D_{share}(\cdot)$ represents the shared discriminant model, $h(\cdot)$ represents the output of the hidden layer module of the target model, $x_i$ represents benign samples, $x_i^{adv,j}$ represents adversarial examples, $G_{SF}(\cdot)$ represents the significant feature generation model. The purpose of training the shared discriminant model is to minimize $\text{loss}_D^{adv,SF}$.

The input of the significant feature generation model is $h(x_i^{adv,j})$, the output of the model is $G_{SF}(h(x_i^{adv,j}))$, the purpose of training the model is to make the distribution of generated significant feature close to the real distribution of significant feature and the generated distribution cannot be recognized by the shared discriminant model. During the stage of training the significant feature generation model, the generated significant feature is marked as 1, taking the cross-entropy function as the loss function as shown in equation (4):

$$\text{loss}_G^{adv,SF} = \log(1 - D_{share}(G_{SF}(h(x_i^{adv,j})))) \quad (4)$$

The purpose of the training the significant generation model is to minimize $\text{loss}_G^{adv,SF}$.

(b) Training the generation of nonsignificant features of adversarial examples according to the built feature mapping model.

While training the nonsignificant feature generation of adversarial examples, the training model is composed of the nonsignificant feature generation model and the shared discriminant model. The nonsignificant feature generation model is denoted as $G_{NSF}(\cdot)$ and the shared discriminant model is denoted as $D_{share}(\cdot)$.

The training process of these two models alternate, while training the shared discriminant model, the parameters of the nonsignificant feature generation model are fixed. The input of the target model is $x_i^{adv,j}$, the output of the hidden layer module of the target model is $h(x_i^{adv,j})$, and the output is used as the input of nonsignificant feature generation model. The input of the shared discriminant model is $h(x_i^{adv,j})$ and $G_{NSF}(h(x_i^{adv,j}))$, the training purpose is to discriminate whether the input features are real nonsignificant features or generated nonsignificant features, the output result is 1 or 0. During the stage of training the shared discriminant model, the real nonsignificant feature $h(x_i^{adv,j})$ is marked as 1, the generated nonsignificant feature $G_{NSF}(h(x_i^{adv,j}))$ is marked as 0, take the cross entropy function as the loss function as shown in equation (5):

$$\text{loss}_D^{adv,NSF} = -[\log(D_{share}(h(x_i^{adv,j}))) + \log(1 - D_{share}(G_{NSF}(h(x_i^{adv,j}))))] \quad (5)$$

Where in equation (5), $\log(\cdot)$ represents the logarithmic function, $D_{share}(\cdot)$ represents the shared discriminant model, $h(\cdot)$ represents the output of the hidden layer module of the target model, $x_i^{adv,j}$ represents adversarial examples, $G_{NSF}(\cdot)$ represents the nonsignificant feature generation model. The purpose of training the shared discriminant model is to minimize $\text{loss}_D^{adv,NSF}$.

The input of the nonsignificant feature generation model is $h(x_i^{adv,j})$, the output of the model is $G_{NSF}(h(x_i^{adv,j}))$, the purpose of training the model is to make the distribution of generated nonsignificant feature close to the real distribution of nonsignificant feature and the generated distribution cannot be recognized by the shared discriminant model. During the stage of training the significant feature generation model, the generated nonsignificant feature is marked as 1, taking the cross-entropy function as the loss function as shown in equation (6):

$$\text{loss}_G^{adv,NSF} = \log(1 - D_{share}(G_{NSF}(h(x_i^{adv,j})))) \quad (6)$$

The purpose of the training the significant generation model is to minimize $\text{loss}_G^{adv,NSF}$.

(c) Training the generation of significant features of benign samples according to the built feature mapping model.

While training the significant feature gene ration of benign samples, the training model is composed of the significant feature generation model and the shared discriminant model. Denote the significant feature generation model as $G_{SF}(\cdot)$ and denote the shared discriminant model as $D_{share}(\cdot)$.

The training process of these two models alternate, while training the shared discriminant model, the parameters of the significant feature generation model are fixed. The input of the target model is $x_i$, the output of the hidden layer module of the target model is $h(x_i)$, and the output is used as the input of significant feature generation model. The input of the shared discriminant model is $h(x_i)$ and $G_{SF}(h(x_i))$, the training purpose is to discriminate whether the input features are real significant features or generated significant features, the output result is 1 or 0. During the stage of training the shared discriminant model, the real significant feature $h(x_i)$ is marked as 1, the generated significant feature $G_{SF}(h(x_i))$ is marked as 0, take the cross entropy function as the loss function as shown in equation (7):

$$\text{loss}_D^{ben,SF} = -[\log(D_{share}(h(x_i))) + \log(1 - D_{share}(G_{SF}(h(x_i))))] \quad (7)$$

Where in equation (7), $\log(\cdot)$ represents the logarithmic function, $D_{share}(\cdot)$ represents the shared discriminant model, $h(\cdot)$ represents the output of the hidden layer module of the target model, $x_i$ represents benign samples, $G_{SF}(\cdot)$ represents the significant feature generation model. The purpose of training the shared discriminant model is to minimize $\text{loss}_D^{ben,SF}$.

The input of the significant feature generation model is $h(xt)$, the output of the model is $G_{SF}(h(x_i))$, the purpose of training the model is to make the distribution of generated significant feature close to the real distribution of significant feature and the generated distribution cannot be recognized by the shared discriminant model. During the stage of training the significant feature generation model, the generated significant feature is marked as 1, taking the cross-entropy function as the loss function as shown in equation (8):

$$\text{loss}_G^{ben,SF} = \log(1 - D_{share}(G_{SF}(h(x_i)))) \quad (8)$$

The purpose of the training the significant generation model is to minimize $\text{loss}_G^{ben,SF}$.

(d) Training the generation of nonsignificant features of benign samples according to the built feature mapping model.

While training the nonsignificant feature generation of benign samples, the training model include the nonsignificant feature generation model and the shared discriminant model. Denote the nonsignificant feature generation model as $G_{NSF}(\cdot)$ and denote the shared discriminant model as $D_{share}(\cdot)$.

The training process of these two models alternate, while training the shared discriminant model, the parameters of the nonsignificant feature generation model are fixed. The input of the target model is $x_i$, the output of the hidden layer module of the target model is $h(x_i)$, and the output is used as the input of the nonsignificant feature generation model. The input of the shared discriminant model is $h(x_i)$ and $G_{NSF}(h(x_i))$, the training purpose is to discriminate whether the input features are real nonsignificant features or generated nonsignificant features, the output result is 1 or 0. During the stage of training the shared discriminant model, the real significant feature $h(x_i)$ is marked as 1, the generated significant feature $G_{NSF}(h(x_i))$ is marked as 0, take the cross entropy function as the loss function as shown in equation (9):

$$loss_D^{ben,NSF} = -[\log(D_{share}(h(x_i))) + \log(1 - D_{share}(G_{NSF}(h(x_i))))] \quad (9)$$

Where in equation (9), $\log(\cdot)$ represents the logarithmic function, $D_{share}(\cdot)$ represents the shared discriminant model, $h(\cdot)$ represents the output of the hidden layer module of the target model, $x_i$ represents benign samples, $G_{NSF}$ represents the nonsignificant feature generation model. The purpose of training the shared discriminant model is to minimize $loss_D^{ben,NSF}$.

The input of the significant feature generation model is $h(x_i)$, the output of the model is $G_{NSF}(h(x_i))$, the purpose of training the model is to make the distribution of generated nonsignificant feature close to the real distribution of nonsignificant feature and the generated distribution cannot be recognized by the shared discriminant model. During the stage of training the nonsignificant feature generation model, the generated nonsignificant feature is marked as 1, take the cross-entropy function as the loss function as shown in equation (10):

$$loss_G^{ben,NSF} = \log(1 - D_{share}(G_{NSF}(h(x_i)))) \quad (10)$$

The purpose of the training the significant generation model is to minimize $loss_G^{ben,NSF}$.

(e) The joint training of feature mapping model.

In summary, there are mainly 3 losses during training: the loss of the significant feature generation model, the loss of the nonsignificant feature generation model, and the loss of shared discriminant model, the corresponding models of these three losses are the significant feature generation model, the nonsignificant feature generation model, and the shared discriminant model, respectively. The training mechanism of these three models is "2-1" alternate training, the significant feature generation model $G_{SF}(\cdot)$ and nonsignificant feature generation model $G_{NSF}(\cdot)$ are independent and these two models can be training simultaneously. Hence, $G_{SF}(\cdot)$–$G_{NSF}(\cdot)$ and shared discriminant model trains interchangeably.

$$loss_D = loss_D^{adv,SF} + loss_D^{adv,NSF} + loss_D^{ben,SF} + loss_D^{ben,NSF} \quad (11)$$

The loss function of training $G_{SF}(\cdot)$–$G_{NSF}(\cdot)$ is:

$$loss_G = loss_G^{adv,SF} + loss_G^{adv,NSF} + loss_G^{ben,SF} + loss_G^{ben,NSF} \quad (12)$$

The parameter-determined feature remapping model can be obtained after training.

S102, building the detector according to the significant feature generation model and the nonsignificant feature generation model, the detector is used to detect adversarial examples and benign samples.

As shown in FIG. 2, after completing the training of the feature mapping model, the shared discriminant model is removed from the feature mapping model, and the output layers of the significant feature generation model and the nonsignificant feature mapping model are cascaded, then the cascaded layer is used as the input layer module of the detector.

The hidden layer module of the detection model adopts a fully connected network. The difference is that there is a transition layer between the hidden layer module and the output layer model. The transition layer between the hidden layer module and the output layer module of the detection model is designed to fully connect the output of the hidden layer module to a fully connected layer with 128 neurons, and then connect the 128 neurons of the fully connected layer to the output layer module.

The detection model adopts the cross entropy function as the loss function, the input of the model is the cascaded connection of $G_{SF}(\cdot)$ and $G_{NSF}(\cdot)$, and it can be denoted as $concat(G_{SF}(\cdot), G_{NSF})$, where $concat(\cdot,\cdot)$ represents the cascade function. The formula of the loss function is:

$$loss_{detect} = -[\log(Det(concat(G_{SF}(h(x_i)), G_{NSF}(h(x_i))))) + \log(1 - Det(concat(G_{SF}(h(x_i^{adv,j})), G_{NSF}(h(x_i^{adv,j})))))] \quad (13)$$

Where in equation (13), $\log(\cdot)$ represents the logarithmic function, $Det(\cdot)$ represents the detection model, $h(\cdot)$ represents the output of the hidden layer module of the target model, $x_i$ represents benign samples, $x_i^{adv,j}$ represents the corresponding adversarial examples, $G_{SF}(\cdot)$ represents the significant feature generation model, $G_{NSF}(\cdot)$ represents the nonsignificant feature generation model. The purpose of training the shared discriminant model is to minimize $loss_{detect}$.

S103, building the re-recognizer according to the significant feature generation model, the re-recognizer is used to recognize the classes of adversarial examples.

After completing the training of the detection model, the detection model can recognize adversarial examples and benign samples in the test set, for the samples being recognized as benign samples, re-inputting into the target model for recognition; for the samples being recognized as adversarial examples, building the re-recognize model for further recognize. As shown in FIG. 3, to remove the nonsignificant feature generation model, only keeping the significant feature generation model, and the output of the significant feature generation model is used as the input of the re-recognize model.

The input of the re-recognize model is the output of the significant feature generation model, it can be denoted as $G_{SF}(h(x_i^{adv,j}))$, the output layer module is a full connected layer contains m neurons activated by Softmax function. The structure of the hidden layer module of the re-recognize model follows the three strategies mentioned in section 2.2. The only difference is that there is a transition layer between the hidden layer module and the output layer model. The transition layer between the hidden layer module and the output layer module of the re-recognize model is designed to fully connect the output of the hidden layer module to a fully connected layer with 512 neurons, and then connect the 512 neurons of the fully connected layer to the output layer module.

The training of the re-recognize model is a multi-classification task, and the loss function of this model is the cross-entropy function.

$$loss_{re-recog} = -\sum_{i=1}^{N_{sam}^{adv}} \sum_{k=0}^{m-1} y_i^{one-hot(k)} \log\left(y_i^{conf(k)}\right) \quad (14)$$

Where in equation (14), log(·) implies the logarithmic function; $y_i^{one-hot(k)}$ represents the value at the k-th position for the adversarial example corresponding to the original benign sample after being encoded by one-hot, k is the original sample classification index; $y_i^{conf(k)}$ represents $h(x_i^{adv,j})$ obtained after the adversarial example input into the target model, then input $h(x_i^{adv,j})$ to a parameter-determined significant feature generation model to obtain $G_{SF}(h(x_i^{adv,j}))$, and input the generated significant feature into the re-recognize model to get the value at the k-th position of the confidence matrix; m represents the classification number of the original sample; i is the adversarial example classification index, and $N_{sam}^{adv}$ represents the amount of adversarial examples in the training set.

S104, while detecting adversarial examples, connecting the detector to the output of the target model, then use the detector to detect adversarial examples.

S105, while recognizing adversarial examples, connecting the re-recognizer to the output of the target model, then use the re-recognizer to recognize adversarial examples.

EXPERIMENTAL VERIFICATION

In this embodiment, outdoor vehicles and natural wildlife recognition applications were taken as a specific scenario, this scenario was a basic scenario for autonomous driving applications. And then attack and defense were carried out on the well-trained deep recognition model to verify the effectiveness of the present method. First, the CIFAR 10 dataset was taken as the training dataset, it is a dataset of color image data that contains 10 classifications, specifically including airplanes, cars, boats, trucks, four types of outdoor vehicles in total and birds, cats, deer, dogs, frogs, 6 types of natural wildlife in total. Each sample image in the CIFAR10 dataset includes an RGB three-channel and with a pixel size of 32*32. 4 recognition models were trained on the CIFAR10 dataset, the code language is Python, the deep learning framework used is Tensorflow, and the basic deep learning structure used includes 4 typical structures of VGG16, VGG19, ResNet50, and ResNet101. The input and output layers of the model were modified to match the training data based on the classic deep model structure. The size of the input layer is 32*32*3, and the output layer contains 10 neurons. After the model training was complete, the samples were selected that can be correctly recognized by the target model from the 10,000 samples in the test set of the CIFAR10 dataset, and FGSM, MI-FGSM, and JSMA three attack methods were used to attack these samples to obtain adversarial examples, the attack success rate is shown in Table 1, the maximum disturbed pixel value during the attack is set to 35, and the pixel value range of the original benign sample is [0, 255]. The attack success rate calculation formula is defined as:

$$ASR = \frac{N_{succ}}{N_{toAtt}} \quad (15)$$

Where in equation (15), $N_{toAtt}$ indicates the number of benign samples to be attacked, $N_{succ}$ indicates the number of adversarial examples that successfully attacked.

After the attack was completed, the defense method proposed by the present invention was used for detection, and the detection result is shown in Table 2. The calculation formula of the detection rate is:

$$DR = \frac{N_{succ}^{det}}{N_{toDet}} \quad (16)$$

Where in equation (16), $N_{toDet}$ indicates the samples to be detected, these samples include adversarial examples and benign samples, wherein the adversarial examples are samples that successfully attacked, and the benign samples are samples that can be recognized correctly by the target model, the ratio of adversarial examples to benign samples is 1:1; $N_{succ}^{det}$ indicates the total number of samples that successfully detected adversarial samples as adversarial samples and benign samples as benign samples.

Meanwhile, in the re-recognize stage, the present method was compared with the two defense methods of sample resize and sample rotate, and it was verified that the defense method against adversarial examples based on feature remapping of the present invention has a good effect as shown in Table 3. The resize operation was to shrink the sample to be recognized to half of its original size, then re-enlarge it to the original size, the bilinear interpolation was used during the resize process; the rotate operation was to rotate the sample to be recognized clockwise by a random angle, then filled in the blank part with Gaussian noise after rotation, the random rotation range was [0°, 45°]. The calculation formula of the recognition accuracy in the re-recognition stage is:

$$acc = \frac{N_{succ}^{re-recog}}{N_{toRe-recog}} \quad (17)$$

Where in equation (17), $N_{toRe-recog}$ indicates the number of samples detected as adversarial examples, $N_{succ}^{re-recog}$ mice indicates the number of samples both successful and accurate recognized among the samples to be re-recognized.

TABLE 1

The attack success rate of different attack methods against different target models on the CIFAR10 dataset

| Target model | FGSM | MI-FGSM | JSMA |
|---|---|---|---|
| VGG16 | 100.00% | 100.00% | 93.50% |
| VGG19 | 98.50% | 98.30% | 92.00% |
| ResNet50 | 100.00% | 100.00% | 96.25% |
| ResNet101 | 99.00% | 100.00% | 94.35% |

TABLE 2

The detection rate of the adversarial examples obtained by the present method under different attacks

| Target model | FGSM | MI-FGSM | JSMA |
|---|---|---|---|
| VGG16 | 95.16% | 96.11% | 95.34% |
| VGG19 | 96.10% | 97.36% | 96.73% |
| ResNet50 | 97.82% | 96.42% | 99.44% |
| ResNet101 | 97.31% | 96.95% | 99.24% |

TABLE 3

The accuracy of the adversarial examples re-recognized under different attack methods using the present defense method

| Target model | Defense method | FGSM | MI-FGSM | JSMA |
|---|---|---|---|---|
| VGG16 | The present embodiment | 96.78% | 94.58% | 99.13% |
| | resize | 86.99% | 80.12% | 80.88% |
| | rotate | 74.46% | 83.81% | 89.89% |
| VGG19 | The present embodiment | 95.98% | 96.92% | 95.26% |
| | resize | 87.05% | 72.35% | 82.08% |
| | rotate | 71.78% | 88.85% | 64.50% |
| ResNet50 | The present embodiment | 95.73% | 94.39% | 97.08% |
| | resize | 76.68% | 76.41% | 87.75% |
| | rotate | 72.89% | 77.07% | 62.07% |
| ResNet101 | The present embodiment | 94.32% | 94.26% | 95.00% |
| | resize | 75.48% | 87.28% | 63.60% |
| | rotate | 76.22% | 86.60% | 77.74% |

Although the embodiments have been described in detail of the technical solution and the benefit effects of the present disclosure, it should be understood that various changes, substitutions, and alternations can be made herein. Moreover, the scope of the present application is not intended to be limited to the particular embodiments of the process, machine, manufacture, composition of matter, means, methods and steps described in the specification.

The invention claimed is:

1. A defense method against adversarial examples based on feature remapping, comprising the following steps:
   building a feature remapping model, wherein the feature remapping model is composed of a significant feature generation model and a nonsignificant feature generation model, and a shared discriminant model, wherein the significant feature generation model is used to generate significant features, the nonsignificant feature generation model is used to generate nonsignificant features, and the shared discriminant model is used to discriminate fake or real of generated significant and nonsignificant features; and
   combing the significant feature generation model and the nonsignificant feature generation model together to build a detector that is used to detect adversarial examples and benign samples;
   building a re-recognizer according to the significant feature generation model, the re-recognizer is used to recognize the type of adversarial examples; and
   while detecting adversarial examples, connecting the detector to an output of a target model, then using the detector to detect adversarial examples; and
   while recognizing adversarial examples, connecting the re-recognizer to the output of the target model, then using the re-recognizer to recognize adversarial examples,
   wherein the steps of building the feature remapping model comprise:
   building a training system of the feature remapping mode, wherein the training system is composed of the target model, the significant feature generation model, the nonsignificant feature generation model, and the shared discriminant model, wherein the target model is used to recognize targets, input of the model are samples, and the model outputs features of hidden layers; input of the significant feature generation model are features of hidden layers, and the model outputs significant features; input of the nonsignificant feature generation model are features of hidden layers, and the model outputs nonsignificant features; input of shared discriminant model is generated significant features, generated nonsignificant features, real significant features, and real nonsignificant features, the model outputs recognition results of benign samples or adversarial examples;
   building loss function $loss_D$ to train the shared discriminant model, training the significant generation model, and training the nonsignificant generation model loss function $loss_G$, using loss functions $loss_D$ and $loss_G$ to train the shared discriminant model, the significant generation model, and the nonsignificant generation model to determine model parameters;
   wherein loss function is $loss_D = loss_D^{adv,SF} + loss_D^{adv,NSF} + loss_D^{ben,SF} + loss_D^{ben,NSF}$, $loss_D^{adv,SF}$ is the loss function of the shared discriminant model while training of significant features generate of adversarial examples, $loss_D^{adv,NSF}$ is the loss function of the shared discriminant model while training of nonsignificant features generate of adversarial examples, $loss_D^{ben,SF}$ is the loss function of the shared discriminant model while training of significant features generate of benign samples, $loss_D^{ben,NSF}$ is the loss function of the shared discriminant model while training of nonsignificant features generate of benign samples;
   wherein the loss function $loss_G = loss_G^{adv,SF} + loss_G^{adv,NSF} + loss_G^{ben,SF} + loss_G^{ben,NSF}$, $loss_G^{adv,SF}$ is the loss function of the significant feature generation model while training of significant features generation of adversarial examples, $loss_G^{adv,NSF}$ is the loss function of the nonsignificant feature generation model while training of nonsignificant features generation of adversarial examples, $loss_G^{ben,SF}$ is the loss function of the significant features generation model while training of significant features generation of benign samples, $loss_G^{ben,NSF}$ is the loss function of the nonsignificant feature generation model while training of nonsignificant features generation of benign samples.

2. A defense method against adversarial examples based on feature remapping, comprising the following steps:
   building a feature remapping model, wherein the feature remapping model is composed of a significant feature generation model and a nonsignificant feature generation model, and a shared discriminant model, wherein the significant feature generation model is used to generate significant features, the nonsignificant feature generation model is used to generate nonsignificant features, and the shared discriminant model is used to discriminate fake or real of generated significant and nonsignificant features; and
   combing the significant feature generation model and the nonsignificant feature generation model together to build a detector that is used to detect adversarial examples and benign samples;

building a re-recognizer according to the significant feature generation model, the re-recognizer is used to recognize the type of adversarial examples; and while detecting adversarial examples, connecting the detector to an output of a target model, then using the detector to detect adversarial examples; and while recognizing adversarial examples, connecting the re-recognizer to the output of the target model, then using the re-recognizer to recognize adversarial examples, wherein the approach of building the detector is:

building a training system of the detector, wherein the training system is composed of the target model, a parameter-determined significant feature generation model, a parameter-determined nonsignificant feature generation model, and a detect model; wherein the target model is used to target recognize, input of the model are samples, and the model outputs features of hidden layers; input of the nonsignificant feature generation model are features of hidden layers, and the model outputs nonsignificant features; input of the detection model is cascaded feature of generated significant features and generated nonsignificant features, the model outputs detection results of benign samples or adversarial examples;

building a loss function loss$_{detect}$ for training the detection model to minimize the loss function loss$_{detect}$ and to determine model parameters;

wherein the loss function loss$_{detect}$ is:

loss$_{detect}$=−[log(Det(concat($G_{SF}(h(x_i))$,$G_{NSF}(h(x_i))$)))+
log(1−Det(concat($G_{SF}(h(x_i^{adv,j}))$,$G_{NSF}(h(x_i^{adv,j}))$)))]

wherein in loss function loss$_{detect}$, log(·) implies the logarithmic function, Det(·) is the detection model, h(·) represents the output of hidden layers of the target model, $x_i$ represents benign samples, $x_i^{adv,j}$ indicates the adversarial examples corresponds with $x_i$, $G_{SF}(·)$ represents the significant feature generation model, $G_{NSF}(·)$ represents the nonsignificant feature generation model, and concat($G_{SF}(·)$, $G_{NSF}(·)$) represents the cascaded feature.

3. A defense method against adversarial examples based on feature remapping, comprising the following steps:

building a feature remapping model, wherein the feature remapping model is composed of a significant feature generation model and a nonsignificant feature generation model, and a shared discriminant model, wherein the significant feature generation model is used to generate significant features, the nonsignificant feature generation model is used to generate nonsignificant features, and the shared discriminant model is used to discriminate fake or real of generated significant and nonsignificant features; and combing the significant feature generation model and the nonsignificant feature generation model together to build a detector that is used to detect adversarial examples and benign samples;

building a re-recognizer according to the significant feature generation model, the re-recognizer is used to recognize the type of adversarial examples; and while detecting adversarial examples, connecting the detector to an output of a target model, then using the detector to detect adversarial examples; and while recognizing adversarial examples, connecting the re-recognizer to the output of the target model, then using the re-recognizer to recognize adversarial examples, wherein the steps of building the re-recognizer comprise:

building a training system of the detector, wherein the training system is composed of the target model, the parameter-determined significant feature generation model, and the re-recognize model, wherein the target model is used to recognize targets, input of the model are samples, and the model outputs features of hidden layers, input of the significant feature generation model are features of hidden layers, and the model outputs significant features, input of the re-recognize model are generated significant features, and the model outputs types of adversarial examples;

building the loss function loss$_{re-recog}$ for training the re-recognition model to minimize the loss function loss$_{re-recog}$ and to determine model parameters;

wherein the loss function loss$_{re-recog}$ is:

$$loss_{re-recog} = -\sum_{i=1}^{N_{sam}^{adv}} \sum_{k=0}^{m-1} y_i^{one-hot(k)} \log\left(y_i^{conf(k)}\right)$$

Where in loss function loss$_{re-recog}$, log(·) implies the logarithmic function, $y_i^{one-hot(k)}$ represents the value at the k-th position for the adversarial example corresponding to the original benign sample after being encoded by one-hot, k is the original sample classification index, $y_i^{conf(k)}$ represents $h(x_i^{adv,j})$ obtained after the adversarial example input into the target model, then input $h(x_i^{adv,j})$ to a parameter-determined significant feature generation model to obtain $G_{SF}(h(x_i^{adv,j}))$ and input the generated significant feature into the re-recognize model to get the value at the k-th position of the confidence matrix; k is the original sample classification index, m represents the classification number of the original sample; i is the adversarial example classification index, and $N_{sam}^{adv}$ represents the amount of adversarial examples in the training set.

4. The defense method against adversarial examples based on feature remapping according to claim 1, wherein the approach of training feature remapping model, detector, and re-recognizer covers:

(a) for the original benign samples $x_i$, testing whether predicted labels in the target model are consistent with real labels first, if not, then eliminating the benign samples and do not attack these samples, if so, then go to step (b); and (b) for the target model and the benign samples $x_i$, using $m_a$ different attack methods to attack, then obtaining the corresponding adversarial example set $\{x_i^{adv,1}, x_i^{adv,2}, \ldots, x_i^{adv,m_a}\}$; and (c) after the attack complete, inputting the adversarial examples obtained in adversarial example set in step (b) to the target model one by one for testing, if the predicted labels are not consistent with real labels, that indicates the attack is successful, and keeping the adversarial example in the set; if consistent, that indicates the attack failed, the sample should be from the set; and (d) repeating step (a)~(c) to collect the set of adversarial examples for all samples; and (e) resorting the samples in the adversarial example set $X^{adv} = \{x_i^{adv,j}\}$.

5. The defense method against adversarial examples based on feature remapping according to claim 1, wherein the significant feature generation model and the nonsignificant feature generation model have the same structure, which is an input layer, a hidden unit, and an output layer, successively, wherein the hidden unit contains several hidden layers, and each hidden layer is at least a fully connected layer or a convolutional layer.

6. The defense method against adversarial examples based on feature remapping according to claim 1, wherein the shared discriminant model, the detection model, and the re-recognize model have the same structure, which is an input layer, a hidden unit, a transition layer, and an output layer, successively, wherein the hidden unit contains several hidden layers, and each hidden layer is at least a fully connected layer or a convolutional layer.

7. A defense method against adversarial attacks in autonomous driving, wherein the method comprises the steps of utilizing dataset containing 4 types of outdoor vehicles and 6 types of natural wildlife images as the training set, and utilizing the defense method against adversarial examples based on feature remapping as claimed in claim 1 to build the detector and the re-recognizer, while detecting adversarial examples, connecting the detector to the output of the target model and utilizing the detector to detect adversarial examples; while recognizing adversarial examples, connecting the re-recognizer to the output of the target model and utilizing the re-recognizer to recognize adversarial examples.

* * * * *